(No Model.)
W. M. SPICER.
THILL COUPLING.
No. 387,460.            Patented Aug. 7, 1888.
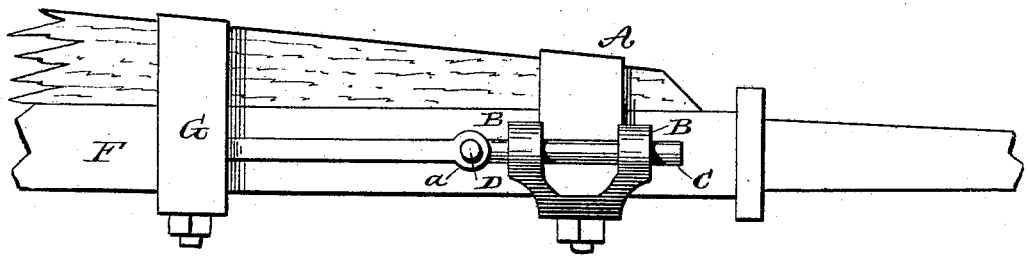
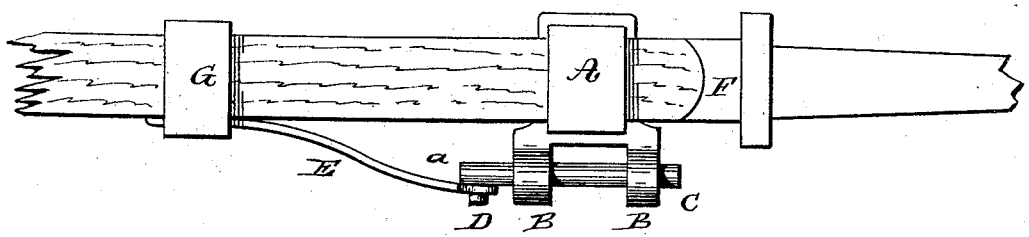
WITNESSES:
INVENTOR:
W. M. Spicer
BY Munn & Co.
ATTORNEYS.

UNITED STATES PATENT OFFICE.

WILLIAM M. SPICER, OF WELLSVILLE, NEW YORK, ASSIGNOR OF ONE-HALF TO WILLIAM BRUCE, OF SAME PLACE.

THILL-COUPLING.

SPECIFICATION forming part of Letters Patent No. 387,460, dated August 7, 1888.

Application filed March 16, 1888. Serial No. 267,398. (No model.)

*To all whom it may concern:*

Be it known that I, WILLIAM M. SPICER, of Wellsville, in the county of Alleghany and State of New York, have invented a new and Improved Coupling-Pin, of which the following is a specification, reference being had to the annexed drawings, forming a part thereof, in which—

Figure 1 is a side elevation of my improved coupling-pin, and Fig. 2 is a plan view.

Similar letters of reference indicate corresponding parts in both views.

The object of my invention is to provide a coupling-pin for thill and pole couplings which will remain in place in the thill-irons and will not rattle.

My invention consists in the combination, with a pin provided with a stud projecting from one side thereof, of a spring attached to the axle and provided with an eye for receiving the stud of the pin, all as hereinafter more fully described.

The clip A is provided with the usual ears, B, for receiving the thill or pole iron, the ears being apertured to receive the coupling-pin C. A stud, D, projects from one side of the coupling-pin near the inner end thereof. A flat curved spring, E, attached to the axle F by the clip G, is provided with an eye, $a$, in the free end thereof for receiving the stud D, projecting from the side of the coupling-pin C. The coupling-pin may be removed after withdrawing the eye of the spring from the stud D.

When the thill or pole irons are inserted between the ears B and secured by the pin C, the eye $a$ of the spring E is brought into engagement with the stud D, thereby preventing the pin C from turning or moving longitudinally, and the spring E, by pressing the pin C toward the axle, prevents all rattling.

My improved coupling-pin is less expensive than the ordinary bolt, and may be placed in the position of use in much less time than is required for removing or applying a nut to an ordinary bolt.

Having thus described my invention, I claim as new and desire to secure by Letters Patent—

1. The combination, with a clip provided with apertured ears, of a pin fitting in said apertured ears and provided with a stud, and a spring adapted to have one end secured to the axle and provided with an aperture in its free end to receive the stud of the pin, substantially as described.

2. The combination, with the clip A, provided with the apertured ears B, of the pin C, having the stud D, the spring E, provided with the eye $a$, adapted to receive the stud D, and the clip G, substantially as described.

WILLIAM M. SPICER.

Witnesses:
CHARLEY C. CARMAN,
WM. J. WHITWOOD.